(12) United States Patent
Dunn et al.

(10) Patent No.: US 9,021,056 B2
(45) Date of Patent: Apr. 28, 2015

(54) METADATA PREDICTION OF OBJECTS IN A SOCIAL NETWORKING SYSTEM USING CROWD SOURCING

(75) Inventors: Jeffrey Scott Dunn, Seattle, WA (US); Robert William Cathcart, San Francisco, CA (US); Cameron Alexander Marlow, Menlo Park, CA (US); Mukund Narasimhan, Bellevue, WA (US); Yuankai Ge, Palo Alto, CA (US); Venkataramanan Iyer Nandagopal, Mountain View, CA (US); Chad Little, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 571 days.

(21) Appl. No.: 13/324,776

(22) Filed: Dec. 13, 2011

(65) Prior Publication Data

US 2013/0151612 A1    Jun. 13, 2013

(51) Int. Cl.
*G06F 15/16* (2006.01)
*G06Q 10/00* (2012.01)

(52) U.S. Cl.
CPC ...................................... *G06Q 10/00* (2013.01)

(58) Field of Classification Search
CPC ..................... G06Q 30/0281; G06Q 30/0631
USPC ............................ 709/204, 206, 217; 705/319
See application file for complete search history.

(56) References Cited

U.S. PATENT DOCUMENTS

| | | | | |
|---|---|---|---|---|
| 7,925,743 | B2* | 4/2011 | Neely et al. | 709/224 |
| 8,473,304 | B2* | 6/2013 | Black | 705/1.1 |
| 8,554,601 | B1* | 10/2013 | Marsh et al. | 705/7.32 |
| 2004/0019584 | A1 | 1/2004 | Greening et al. | |
| 2006/0149708 | A1* | 7/2006 | Lavine | 707/3 |
| 2009/0271368 | A1* | 10/2009 | Channell | 707/3 |
| 2010/0076968 | A1* | 3/2010 | Boyns et al. | 707/732 |
| 2010/0235201 | A1* | 9/2010 | McEvoy | 705/5 |
| 2011/0047213 | A1* | 2/2011 | Manuel | 709/204 |
| 2011/0161987 | A1* | 6/2011 | Huang et al. | 719/318 |
| 2011/0258560 | A1* | 10/2011 | Mercuri et al. | 715/753 |
| 2012/0005221 | A1 | 1/2012 | Ickman et al. | |
| 2012/0029963 | A1 | 2/2012 | Olding et al. | |
| 2012/0029978 | A1 | 2/2012 | Olding et al. | |
| 2012/0303490 | A1* | 11/2012 | Hill et al. | 705/27.2 |
| 2013/0018957 | A1* | 1/2013 | Parnaby et al. | 709/204 |
| 2013/0055354 | A1* | 2/2013 | Weinberg et al. | 726/4 |
| 2013/0066968 | A1* | 3/2013 | Ziegler | 709/204 |
| 2013/0097245 | A1* | 4/2013 | Adarraga | 709/204 |
| 2013/0290233 | A1* | 10/2013 | Ferren et al. | 706/46 |

OTHER PUBLICATIONS

Howe, Jeff, "The Rise of Crowdsourcing" WIRED Magazine, Issue 14.06, Jun. 2006.*

* cited by examiner

*Primary Examiner* — Douglas Blair
(74) *Attorney, Agent, or Firm* — Fenwick & West LLP (57) ABSTRACT

A social networking system leverages user's social information to evaluate content submitted for inclusion in objects. If the evaluated submission is accepted, the submission is added to the content of an object. Accepted submissions are also used to predict associations between metadata and objects. Metadata is used to predict which objects will match user searches for information. The social networking system also provides a user interface configured to prompt users to submit information to objects. When a user completes a submission to an object, the user is provided with other options for groups of objects to contribute to. The objects offered are chosen to increase the likelihood that the user will choose to provide submissions to one of the provided objects.

17 Claims, 6 Drawing Sheets

METADATA PREDICTION OF OBJECTS IN A SOCIAL NETWORKING SYSTEM USING CROWD SOURCING

BACKGROUND

This invention relates generally to social networking, and in particular to predicting metadata associated with objects in a social networking system.

Social networking systems have become prevalent in recent years because they provide a useful environment in which users can connect to and communicate with other users. A variety of different types of social networking systems exist that provide mechanisms allowing users to interact within their social networks. Social networks are particularly adept at organizing incoming social information and displaying the most relevant pieces of information to a user.

Separately from social networking systems, there are a number of internet websites that allow users to describe and curate information so that the information that they provide may be organized and presented to other users. For example, many existing web sites provide ways for users to submit and curate web site content. While these sites provide a wealth of information, the information maintained on these sites can be incorrect or misrepresentative. In some cases, the volume of information posted on such websites makes it difficult for readers to obtain accurate and/or truthful information about a topic.

Existing websites have tried a number of techniques to increase the quality and/or veracity of the information that is provided to users. For example, users who are allowed to edit content (e.g., editors) may be rated according to the number of previous edits they have made, the length of time they have been associated with the website, the amount of positive praise that they have been provided by other users, as well as other metrics for establishing editor credibility. Some websites selectively show or hide information based on positive or negative feedback received from users.

Existing systems, however, have not been able to leverage user's social information to evaluate information provided online.

SUMMARY

A social networking system leverages user's social information to evaluate content submitted for inclusion in objects. The objects may be contain textual, image, video, audio, or other types of content, and may be associated with various items of metadata, for example locations, artists, public figures. Users may search for and view, listen to, watch, or otherwise interact with the objects. The social networking system assigns metadata to objects to predict which objects will match user searches for information.

The social networking system receives submissions from users regarding content to add to objects. For example, if a given object is about a restaurant in San Francisco, additional information may be submitted by users to designate the type of cuisine that the restaurant serves. Submissions may take the form of textual descriptions, however they may also take the form of pictures, audio, video, location information, or other types of media. Submissions may also be aggregated across users and processed to infer information that was not explicitly provided. For example, "check-ins" of users of the social networking system at the location of a particular store may be used to infer the open and closed hours of the store.

The social networking system evaluates submitted content and the submitter's social information to determine whether to incorporate the submitted content into objects. To provide a few examples, previous user check-ins at a location may establish that the user has experience providing first-hand information about a restaurant. A user's friendship connections may be analyzed to ensure diversity between submitters to an object so that no one group of affiliated users may control an object's content. Reputation modeling regarding the user's behavior regarding other objects may be performed to determine if the user is someone who will provide beneficial and/or truthful information. The user's social profile may be analyzed to determine if a user is an expert in the topic of an object.

If the evaluated submission is accepted, the social networking system may use the submission to revise its predictions of associations between metadata and objects. Metadata prediction uses a machine learning algorithm to provide objects to users based on the metadata associated with each object. The accepted submission may be used as a training set for the machine learning algorithm that associates metadata with objects.

The social networking system also provides a user interface configured to prompt users to submit information to objects. When a user completes a submission to an object, the user is provided with other options for groups of objects to contribute to. The groups and objects offered to the user depend upon the expected likelihood of acceptance of the user's feedback, and the relative need of an object for additional content, and the user's social context.

DETAILED DESCRIPTION

Overview of a Social Networking System Network

Figure 1:
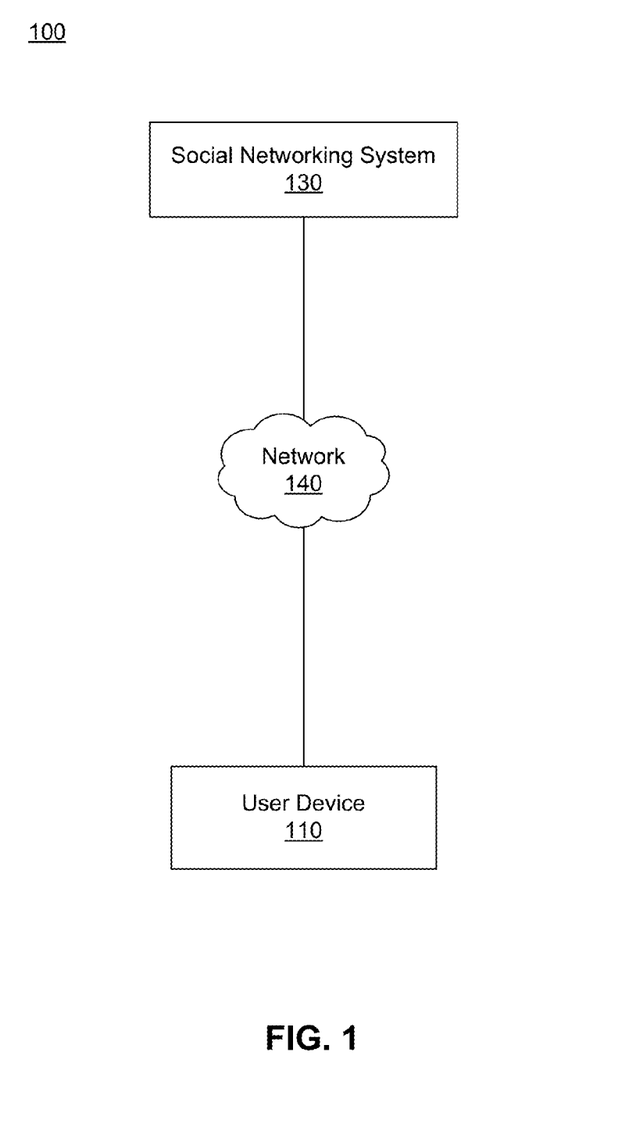
FIG. 1 is a network diagram of one embodiment of a social networking system that uses crowd sourcing to curate and predict metadata for objects, according to one embodiment.

FIG. 1 is a network diagram of one embodiment of a social networking system that uses crowdsourcing to curate and predict content for objects, according to one embodiment. The system 100 includes one or more user devices 110, the social networking system 130, and a network 140. For purposes of illustration, the embodiment of the system 100 shown by FIG. 1 includes a single user device 110. However, in other embodiments, the system 100 may include more user devices 110. The social networking system 130 provides a platform, or backbone, which other systems may use to provide social networking services and functionalities to users across the network 140 (e.g., the internet).

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 140, which may comprise any combination of local area and/or wide area networks, using both wired and wireless communication systems. In one embodiment, the user device 110 displays content from the social networking system 130.

The social networking system 130 comprises one or more computing devices storing a social network, comprising a plurality of users and providing users of the social network with the ability to communicate and interact with other users of the social network. According to various embodiments, the social networking system 130 may comprise a website, or alternatively a server that can be accessed through a wired or wireless network 140 by user devices 110. In use, users join the social networking system 130 and then add connections (i.e., relationships) to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

The social networking system 130 is also capable of linking a variety of entities. For example, the social networking system 130 enables users to interact with each other as well as with objects of content that are associated with metadata that identify the content contained by the object. In addition to establishing and maintaining connections between users and allowing interactions between users and objects, the social networking system 130 provides users with the ability to take actions on various types of information stored in the social networking system 130.

Social Networking System Architecture

Figure 2:
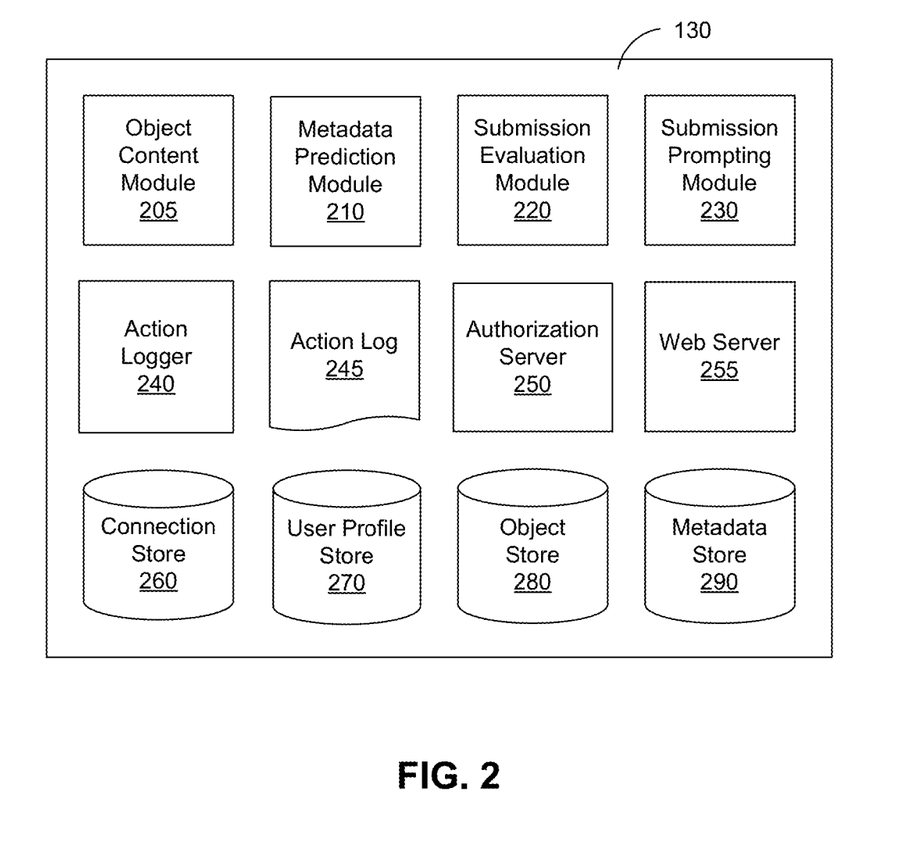
FIG. 2 is a diagram of a social networking system, in accordance with an embodiment of the invention.

FIG. 2 is a diagram of one embodiment of a social networking system 130. The embodiment of a social networking system 130 shown by FIG. 2 includes an object content module 205, a metadata prediction module 210, a submission evaluation module 220, a submission prompting module 230, a web server 255, an action logger 240, an action log 245, an authorization server 250, a user profile store 270, a connection store 260, an object store 280, and a metadata store 290. In other embodiments, the social networking system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 allows users to communicate or otherwise interact with each other and access content as described herein. The social networking system 130 stores user profiles describing the users of a social network in a user profile store 270. The user profiles include biographic, demographic, and other types of descriptive information, such as work experience, educational history, hobbies or preferences, interests, location, and the like. For example, the user profile store 270 contains data structures with fields suitable for describing a user's profile. When a new information item of a particular type is created, the social networking system 130 initializes a new data structure, i.e., a "node" of the corresponding type, assigns a unique identifier to it, and begins to add data to it as needed. This might occur, for example, when a user becomes a user of the social networking system 130, the social networking system 130 generates a new instance of a user profile in the user profile store 270, assigns a unique identifier to the user profile, and begins to populate the fields of the user profile with information provided by the user.

In addition, the user profile store 270 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc. In one embodiment, user's interests may be explicitly specified in the user's profile or interests that may be inferred from the user's activities in the social networking system (e.g., uploaded content, postings, reading of messages, etc). Additionally, the user profile store 270 includes logic for maintaining user interest information for users according to one or more items of metadata. Metadata may be general or specific, e.g., if a user "likes" an article about a brand of shoes the metadata may be the brand, or the more general metadata of "shoes" or "clothing." Multiple items of metadata may apply to a single user interest. In addition, the user profile store 270 may be accessed by other aspects of the social networking system 130.

The social networking system 130 further stores data describing one or more connections between different users in a user connection store 260. The connection information may indicate users who have similar or common work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 260 includes data structures suitable for describing a user's connections to other users and/or connections to metadata. The connection stores 260 may also associate a connection type with a user's connections, which may be used in conjunction with the user's privacy setting, to regulate access to information about the user. In addition, the connection store 260 may be accessed by other aspects of the social networking system 130.

The web server 255 links the social networking system to one or more user devices 110 via the network 140. The web server 255 serves web pages, as well as other web-related content, such as Java, Flash, XML, and so forth. The web server 255 may include a notification and/or mail server or other messaging functionality for receiving and routing messages between the social networking system 130 and one or more user devices 110. The messages can be instant messages, queued messages (e.g., email), text and SMS messages, or any other suitable messaging format.

The action logger 240 is capable of receiving communications from the web server 255 about user actions on and/or off the social networking system 130. The action logger 240 populates the action log 245 with information about user actions, allowing the social networking system 130 to log various actions taken by its users within the social networking system 130 and outside of the social networking system 130. Any action that a particular user takes with respect to another user may be associated with each user's profile, through information maintained in the action log 245 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action may be recorded in the action log 245. In one embodiment, the social networking system maintains the action log 245 as a database of entries. When an action is taken within the social networking system 130, an entry for the action is added to the action log 245. In one embodiment, before any user actions are logged, informed consent to log user activities is received from the user regarding the information to be logged.

The authorization server 250 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external websites or any entity that can potentially access the information. The information that can be shared by a user comprises user profile information like profile photo, phone numbers associated with the user, user's connections, actions taken by the user such as adding a connection, changing user profile information and the like.

Social information that is maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content, objects, groups, events, messages, categories, concepts, and any other thing that can be represented by the social networking system. An edge between two nodes in the social graph represents a particular kind of connection between the two nodes, which may result from an action that was performed by one of the nodes on the other node.

The social networking system 130 may receive a request to associate the web content with a node in the social networking system 130. An external website incorporates a tag into the markup language document for the web page(s) of the web content to claim ownership of the pages/domain in the context of the social networking system 130. In some cases, an entire domain or collection of web pages is associated with a unique identifier that associates the web pages with a node. Once established, the social networking system 130 logs data associated with the node in the action log 230.

Data stored in the connection store 260, the user profile store 270 and the action log 245 allows the social networking system 130 to generate a social graph that uses nodes to identify various information items and edges connecting nodes to identify relationships between different items of information. An edge between two nodes in the social graph represents a particular kind of connection between the two nodes, which may result from an action that was performed by one of the nodes on the other node.

Any content stored or represented by the social networking system may be characterized generally as information items. Information items may be include, for example, as part of a user profile, object, metadata, category, relationship information, recent or upcoming activity information, etc. A few specific examples include major life events such as graduation, marriage, or the birth of a child, as well as minor events such as changes in user location, check-ins, comments on other items in the social networking system, tags to photos and other day to day occurrences. These are just a few examples of the information items that make up the content of a social networking system, and many others are possible.

With respect to user profile information, further examples include anything a user can add, upload, send, or "post," to the social networking system 130. For example, a user communicates posts to the social networking system 130 from a user device 110. Posts may include data such as status updates or other textual data, location information, photos, videos, links, music or other similar data and/or media. Information items may also be added to the social networking system 130 by a third-party through a "communication channel," such as a newsfeed or stream.

The social networking system is also configured to store information items not directly related to particular users. These items may be stored as objects, or in other forms. The information items that make up the objects may be linked by nodes and edges similarly to any other information item stored in the social networking system 130. Objects may be contain textual, image, video, audio, or other types of media content. In addition to storing content, each object may include connections to the users that submitted the content that makes up the object. For example, if an object describes Paris, France and has a picture of the Eiffel Tower uploaded by a user, the object may including identifying information for the user who uploaded the picture. Objects are stored in the object store 280.

Objects are associated with metadata in order to facilitate user search of objects to find content. Metadata may also be included as tags in objects in order link objects together based on similarity of content. Metadata are text descriptors for nouns, for example actual things, ideas, or concepts that have meaning. For example, "Inspector Gadget", "rowing", "sociology", and "comedy" are all examples of metadata. Each object may be associated with one or more items of metadata. For example, if an object discussed the city of Santa Cruz, Calif., it may contain metadata items for UCSC, surfing, California, ocean, beach, etc. Multiple objects may share metadata with each other, which allows a user viewing the object to transition between related objects easily using metadata. Metadata is stored in the metadata store 290.

The metadata prediction module 210 is configured to determine associations between metadata and the content of objects. The metadata prediction module 210 uses a machine learning algorithm assign metadata to new objects when they created, as well as to update the metadata assigned to an object if the content of the object changes.

The submission evaluation module 220 is configured to evaluate user submissions for content to be added or modified in objects. The user submissions are evaluated for a number of reasons, for example to ensure that only true facts are added to an object and to ensure a diversity of opinions regarding non-factual content.

The submission prompting module 230 is configured to prompt users to submit additional content for objects. When a user completes a submission to an object, the user is provided with other options for other objects to contribute to.

The object content module 205 is configured to manage the addition of the content to objects. The object content module 205 receives submission requests from users directly or indirectly from the submission prompting module 230. The object content module 230 communicates with the submission evaluation module 220 to determine whether or not to add the received submissions to the content of an object. Based on the evaluation, the object content module 230 communicates with the metadata prediction module 210 to update the metadata of a object based on the content added from the submission.

Adding Content to a Object

In addition to storing, organizing, and displaying information about users, the social networking system also stores, organizes, and displays content not directly related to users. This content is organized into objects, where the term "objects" is used here in order to distinguish from user-related information (e.g., user profile data), however the format of the stored object content may vary. Content stored in objects is crowdsourced using submissions from the users of the social networking system. Received submissions are evaluated by the social networking system prior to addition to an object in order to improve the overall quality of object content. Object content is organized by assigning metadata to content so that objects may be easily found and shared by users of the social networking system.

Figure 3:
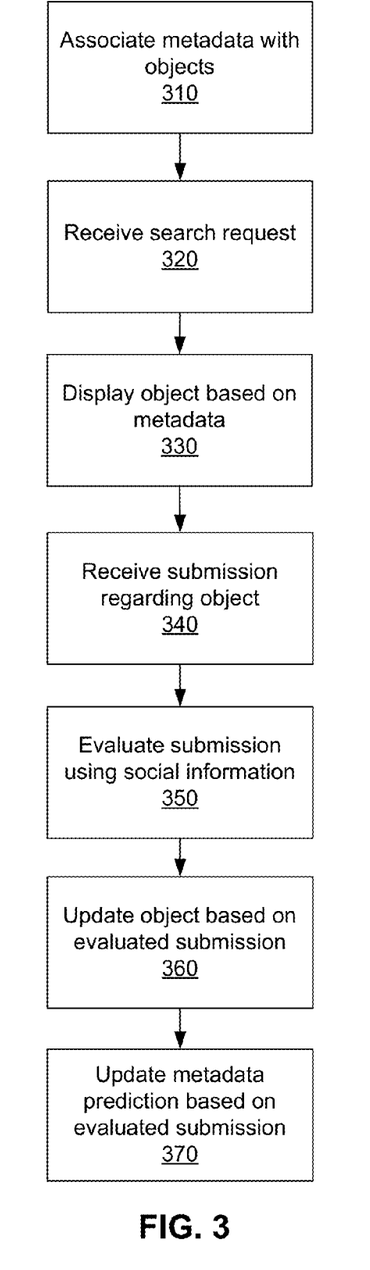
FIG. 3 is a flowchart of a process for using crowd sourcing to curate and predict metadata for objects, according to one embodiment.

FIG. 3 is a flowchart of a process for using crowd sourcing to curate and predict metadata for objects, according to one embodiment. The metadata prediction module 210 of the social networking system 130 is configured to associate 310 metadata from the metadata store 290 with objects from the object store 280. The metadata prediction module 210 assigns metadata to new objects when they created. The metadata prediction module 210 also updates the metadata associated with an object if the content of the object changes.

Associating metadata with objects allows users of the social networking system 130 to easily access objects. For example, metadata allows users to more easily search 320 for objects that match their search requests, as the metadata conveniently summarizes the content contained in the object. In one example, the metadata is incorporated into a search algorithm used by the social networking system 130 to retrieve objects that match a user search request. In another example, metadata may be used as filters to narrow down the search results presented to a user.

Metadata also provides a convenient mechanism for users to transition between viewing related objects. The social networking system 130 may organize objects by grouping objects according to metadata. A displayed object may contain connections to other objects 330, where the connections between objects are based on mutually shared metadata. Users of the social networking system 130 may make use of the connections between objects based on metadata to view other related objects.

The social networking system 130 is configured to receive submissions 340 of content for objects from users. The submissions may be used to create new objects that did not previously exist in the object store 280, as well as to modify the content of existing objects. Submitted content may include content explicitly provided by a submitting user, for example, written text, audio files, video files, pictures, software applications, user affinities, user comments, and user "check-ins" at a location associated with the object. For example, if a user visits a restaurant and takes a picture of a signature dish served at the restaurant, the submitted content may include the picture of the dish, a review of the restaurant, and a description of the type of food served by the restaurant.

In addition to explicitly provided content, submissions by users may also include implicitly provided content. Implicit content is contextual content that was not entered for submission directly by the user, but which was added automatically as part of their submission. Implicit content may be added by the device 110 used by the user to submit the content, or by the software application interfacing with the device 110 performing the submission. Implicit content includes, for example, a time of day of the submission, and a physical real world location of the user when the submission was made.

Implicit content submissions may be combined with explicitly provided information to deduct information that is cannot be directly determined from a submission. For example, if an object is associated with a retailer, the presence of a user in a store location may be used to deduce the physical real world location of the store, assuming it is not already known. This information may be deduced by receiving the location of the device 110 as part of a submission about the store that is provided while the user is in the store.

In another example, a submission of a user location along with a submission of the time of day may be used to deduce the open hours of a stores associated with an object. If a submission includes time and real world location information along with a content regarding the location where the submission takes place, the time and place information may be correlated with the submitted content. For example, if a user visits a boutique clothing store and performs a check-in while located in the store, implicitly submitted time information may be used to deduce that the store is open at least at that time and day of the week. Submissions may be aggregated across multiple users to expound upon individual submissions. For example, to determine the open and closed hours of a store, many user check-ins to the same location at different times may be correlated to determine the open and closed hours of a store.

Not all submitted content adds to the total amount of information present in an object. As user submit information to be added to objects, the social networking system may determine that two objects refer to the same thing. Thus, submissions may result in the removal of duplicate objects or duplicate content.

Further, content submitted by users may be of varying quality and veracity. The submission evaluation module 220 evaluates 350 received submissions to determine whether or not to add submitted content to objects. Based on the evaluation, some submissions may be rejected, and as a result are not added to objects. This may be the case where submitted content purported to be factual is incorrect or is expected to be incorrect based on the analysis performed by the submission evaluation module 220. This may also be the case where submitted content is opinionated in nature, and the social networking system 130 has a goal of diversifying the source of opinions present in objects.

Responsive to the evaluation, if the submitted content is accepted, the object is updated 360 to include the submitted content.

Figure 5:
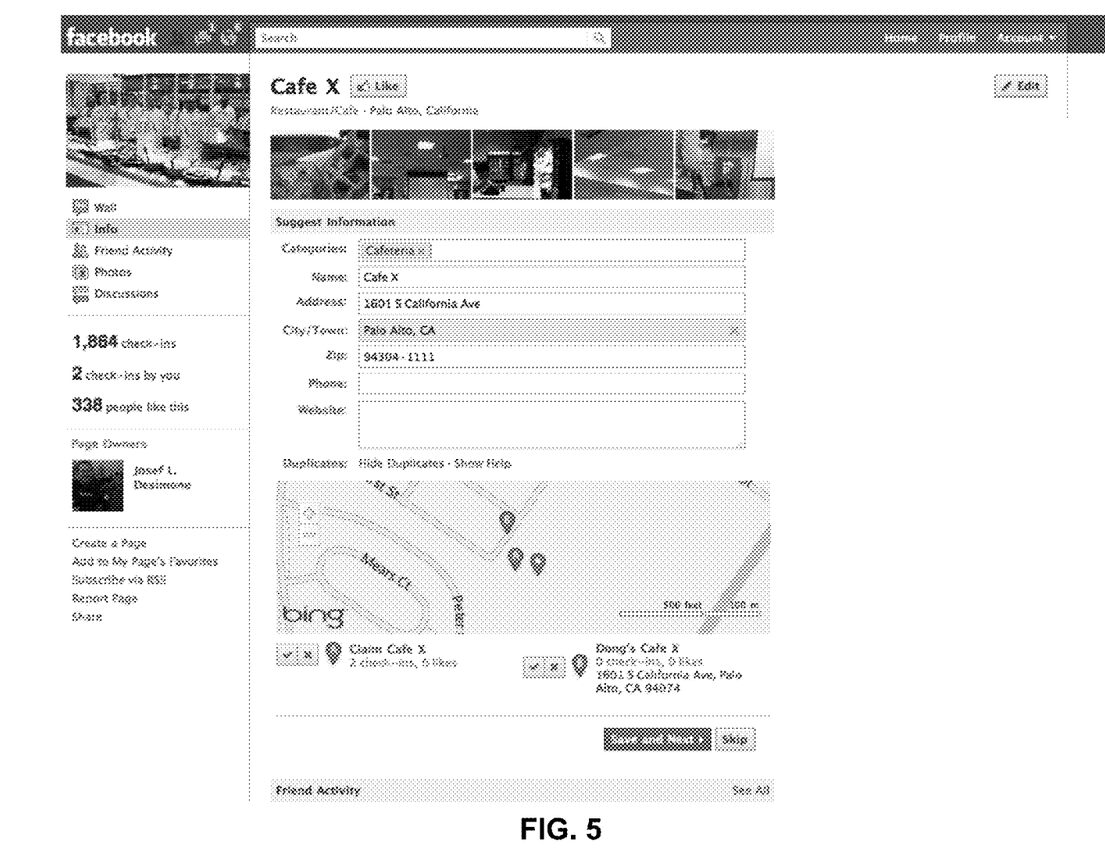
FIG. 5 is an example user interface for receiving user submissions for content for objects stored in a social networking system, according to one embodiment.

FIG. 5 is an example user interface for receiving user submissions for content for objects stored in a social networking system, according to one embodiment. The example of FIG. 5 illustrates a form for a user to complete to submit information for an object of a restaurant named Cafe X. The submitter is offered a number of options for information to submit including, for example, a list of potential metadata to associate with the object, a name for the object, a real world address for the restaurant, and a phone number for the restaurant. A map is provided allowing the submitter to visually indicate the location of the restaurant. An option is provided for the submitter to perform a "check-in" at the location of the restaurant as part of the submission.

Submitting users are also provided with the option of reporting submissions, flagging them as including objectionable or questionable content. The object may then be manually reviewed, for example by another user or an editor associated with the social networking system 130. Reporting a user's submission may also affect the ability of the submitter to submit to objects in the future. For example, a reported object may also have a heightened threshold, as compared to other objects, that must be met before new submissions are accepted to be added to the object.

Submitters may be allowed to create new objects. Users may also choose to follow objects, so that they can keep track of updates to an object's content and more easily submit content to the object. Users may also submit recommendations, comments and affinities for a object. Some types of submitted content, such as check-ins, comments, and affinities may be cross submitted to their own user profiles as well as being submitted to the object.

To facilitate the submission of content to an object, users may also be presented with information regarding the interactions of other users with an object. For example, for a given object, the user may be presented with an indication of how many of their friends, as connected to them through their user profiles and connections through the connection store 260, have expressed an affinity for, commented on, recommended, or submitted content to the given object.

Accepted user submissions that modify the content of an object may be used by the metadata prediction module 210 to improve 370 the quality of the associations made between metadata and objects. The metadata prediction module 310 associates metadata with objects using a machine learning algorithm. Accepted user submissions may be used as training data sets to train the machine learning algorithm. In one embodiment, if the user submissions include proposed metadata for an object, the proposed metadata may be used in conjunction with the content of the object to train the machine learning algorithm.

The machine learning algorithm may be trained using the content of the object in conjunction with information from the user profiles of the users who have submitted accepted content to the object. The machine learning algorithm may further be trained based on the connections between the users who have submitted accepted content to the object.

User Content Submission Evaluation

As described above, submitted content is not necessarily added to objects automatically. Instead, submissions are evaluated to determine whether or not they will be added as content to the objects. User submissions are evaluated according to a number of criteria based upon the type of content included in the submission including, for example, social graph diversity between the submitting user and previous submitters to an object, check-ins relevant to the metadata of a submitter's input, submitter's reputation based on previous submissions, and submitter's expertise relative to a category.

In one embodiment, the evaluation comprises assigning an evaluation score to a submission according to a number of criteria. If the score meets or exceeds an evaluation threshold, the submission is accepted, and the submitted content is processed by the object content module 205 to add the submitted content to the appropriate object. If the score falls below the evaluation threshold, the submission is rejected, and the submitted content is not added to the object. The evaluation score for a submission may be based on the combination of the evaluation scores determined with respect to location experience, diversity, reputation, and/or expertise. For example, the evaluation score for a submission may be the sum of the individual evaluation scores determined for each of experience, diversity, reputation, and/or expertise.

Figure 4:
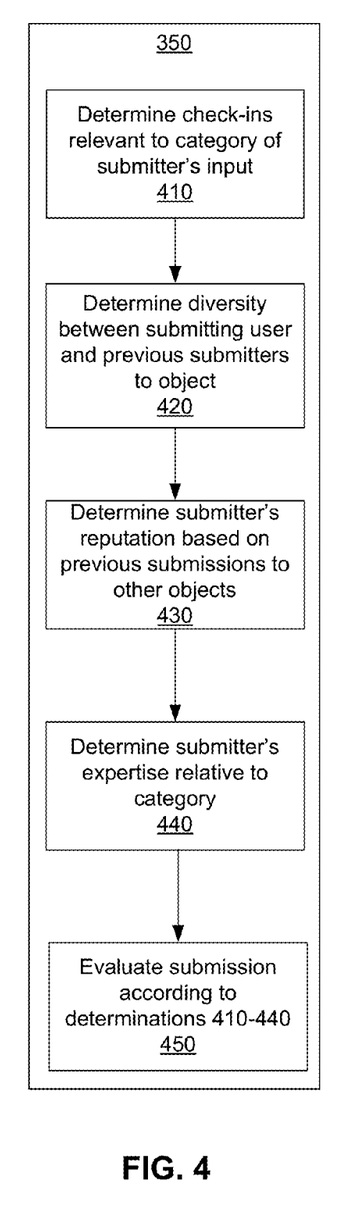
FIG. 4 is a flowchart of a process for evaluating user submissions using social information stored in a social networking system, according to one embodiment.

FIG. 4 is a flowchart of a process for evaluating user submissions using social information stored in a social networking system, according to one embodiment. When evaluating user submission 450 to determine whether or not to add a submission to the content of the object, the submission evaluation module 220 may perform one or more of the illustrated steps 410, 420, 430, and 440 in any sequence as part of the evaluation 350.

For objects that are associated with a real world location, a user's submission may be evaluated based on the user's firsthand experience with having visited the real world location 410. For example, if an object is associated with associated with a national park, a submission of content for the object associated with the national park may be evaluated based on whether or not the submitting user has been to the national park.

If the user has previously been to the location associated with the object, then the evaluation will be more favorable than if they have not been to the location. In one embodiment, if the user has previously been to the location, then the evaluation score is incremented by a first value. If the user has not previously been to the location, then the evaluation score is not incremented, or the evaluation score is not incremented or is decremented by a second value.

Some objects will have many real world locations associated with them. For example, for a chain of retail establishments, there are many locations associated with the chain as a whole. If the user is submitting content that is relevant to the chain as a whole, then the evaluation of whether the user has been to a store location may test only if the user has been to one of the many locations associated with the chain. However, if the user is submitting content relevant to only one instance of a retail establishment, the evaluation of whether the user has been to a store location will include testing if the user has been to the particular store that they are submitting content for.

In some cases, submissions will be received from users while the user is located at real world location associated with the object. In this case, the submission evaluation module 220 evaluates whether the user has been to the real world location by obtaining the user's current location. The user's current location may be obtained from the user device 110.

Submissions may also be received after the user has left the real world location associated with the object. The locations the user has been present at may be obtained from the user profile of the user. For example, if the user has checked in to the real world location at some point in the past, the check-in will appear as part of the user's profile. To determine whether a user has been to the real world location at some point in the past, the submission evaluation module 220 reviews the user's profile to look for check-ins to a particular location.

The user's current location may also be obtained from the user profiles of other users who are connected to the user. For example, if another user connected to the submitting user posts a check-in indicating that they and the submitting user are both at a real world location associated with the object the user is submitting to, the check-in provides sufficient information to determine that the submitting user has been to the location.

Submissions will be evaluated differently depending upon the type of content submitter. Verifiable facts, for example the date of the Apollo 11 moon landing, will be evaluated for truthfulness. If a given fact is already known, the submission may be discarded or included to the extent it corrects a previous error or adds additional detail to a known fact. Opinions, in contrast, may be collected in larger numbers in order to establish a diverse cross section of opinions on a given topic.

To evaluate whether to accept a submission of opinion material, the submission evaluation module 220 determines 420 a degree of diversity between the submitting user and previous submitters whose submitted content has been accepted and added to an object. Degree of diversity is a measure of the level of connection between the submitting user and the previous submitters based on the number of direct and indirect connections between the submitting user and the previous submitters.

A direct connection indicates that the submitting user and a previous submitter are directly connected to each other through their respective user profiles from the user profile store 270 and the connection store 260. An example of a direct connection is a friendship between the submitting user and the previous submitter through their respective profiles. An indirection connection indicates that the submitting user and a previous submitter are not directly connected, but are instead connected only through other users or objects in the social networking system 130. In an example of an indirect connection, the submitting user and the previous submitter are each directly connected to a third user, but not directly to each other. This example illustrates a first degree indirect connection, as the users are indirectly connected through a single intermediate user. Indirect connections may be second, third, fourth, etc. degrees separated, based on the number of direct connections between users to connect the two users in question.

A submitting user will have a higher degree of diversity if they have fewer direct and indirect connections with the previous submitters. A submitting user will have a lower degree of diversity if they have more direct and indirect connections with previous submitters. A higher degree of diversity correlates to a higher evaluation score, whereas a lower degree of diversity correlates to a lower evaluation score. In one embodiment, direct connections contribute more to the degree of diversity than indirect connections, where the contribution of indirect connections decreases as degree of the indirect connection increases.

By giving higher evaluation scores to submissions that are more relatively more diverse, the submissions that will be accepted for inclusion in the object will represent a broader cross section of users of the social networking system 130. This helps prevent the content of objects from being dominated by the contributions of any one group of users.

The submission evaluation module 220 also evaluates submissions with respect to the user's reputation 430 regarding previous submissions. If, for example, the user has a history of submitting truthful or well-received content to objects, the social networking system 130 is more likely to accept a user's most recent submission. Alternatively, if the user's previous submissions have been reported or have not been well received, the social networking system 130 is less likely to accept a user's most recent submission.

A user's reputation may be based on responses received from other users regarding previous submissions by the user. The responses may be with respect to the content of an object as a whole, or more specifically with respect to a specific user submission. Responses may be retrieved from the object store 280 that stores responses in addition to storing object content and the submitters of the content.

Responses may be grouped into positive and negative responses. Positive responses contribute positively to the evaluation score. Examples of positive responses include indications of user affinity and user comments. Negative responses contribute negatively to the evaluation score. Negative responses include reports filed by users for incorrect or objectionable material, as well as recorded instances where a submitter's incorrect information has been replaced in the object with correct information.

The submission evaluation module 220 also evaluates submissions with respect to the user's expertise 440 regarding the topic of the object. If a submitting user has expertise in the topic of an object, it is relatively more likely that their submitted content will be correct or valuable to those viewing the web site. If the submitting user has expertise in the topic of the object, the submission will receive a higher evaluation score relative to a submission by a user who does not have expertise in the topic of the object.

The submitter's expertise is determined using their user profile. The submission evaluation module 220 reviews the contents and connections in the user profile. If the contents of the user profile are related to the contents of the object being submitted to, the submitter is determined to have expertise in the topic of the object. Entries in a user's profile may be related to the content of an object if they share a category, for example. Connections present in the submitter's profile are analyzed to determine other objects that the submitter is affiliated with. Those other objects are analyzed to determine if they are related to the object being submitted to. For example, if the other objects or objects share a category with the object being submitted to, the submitter is determined to have expertise in that topic.

Prompting User Submissions

The social networking system promotes the submission of content to objects in order to increase the amount of content that is available on the objects. When a user completes a submission of content to an object, the user is provided with a user interface containing a list of groups of other objects to submit to. In one embodiment, the user interface is provided regardless of whether the user's previous submission was accepted to be added to the content of the object.

The groups of objects offered to the user to submit to are organized in order to improve the likelihood that the user will choose provide additional submission. The groups of objects are each organized according to a common characteristic that is shared between the objects of the group. Examples of characteristics include objects associated with locations in close real world physical proximity to the location associated with the object the user has just submitted to, objects where the user's friends have checked-in, objects where the submitting user has checked in, objects related to the city where the user lives, and objects that are highly trafficked by other users of the social networking system.

The groups, characterizations, and objects are chosen by the submission prompting module 230. In one embodiment, groups, characterizations, and objects are chosen based on a determination of whether a user's submission would be accepted if user provided an additional submission. This determination is made by performing a hypothetical submission evaluation using the submission evaluation module 220 as described above. In one embodiment, groups, characterizations, and objects are chosen based on the user's profile and the user's connections to other users in the social networking system.

In one embodiment, groups, characterizations, and objects are chosen based on the amount of content they contain. Objects that are complete in terms of content have relatively less need for additional submissions than objects that are empty. For example, if a user creates a object for a restaurant they have visited merely to check-in to that location, the lack of additional information means that the object is not particularly informative for other users. Such empty objects may be candidates for prompting a user to submit to them so that they can become useful objects.

Figure 6:
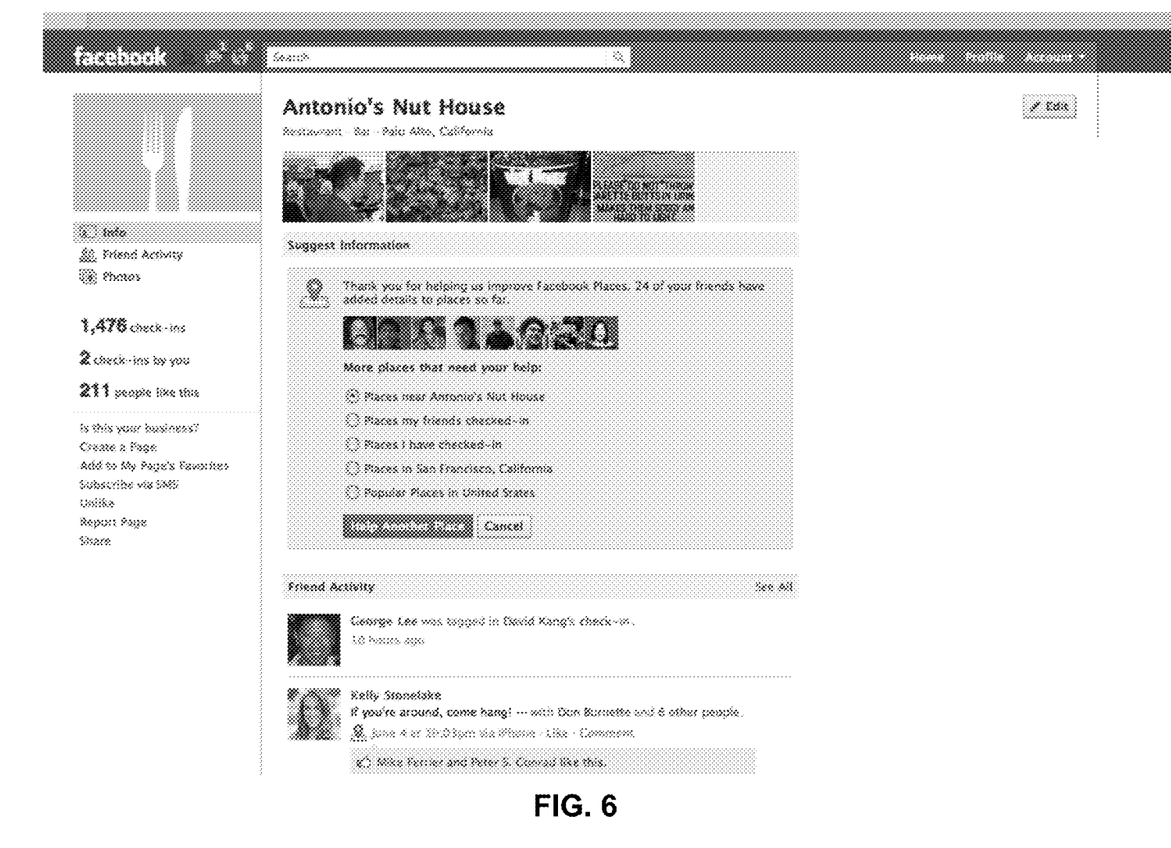
FIG. 6 is an example user interface for prompting users to submit content regarding other metadata and objects, according to one embodiment.

FIG. 6 is an example user interface for prompting users to submit content regarding other objects, according to one embodiment. In the example of FIG. 6, after providing a submission with regard to the bar "Antonio's Nut House", the submission prompting module 230 provides the submitting user with a user interface containing a list of options of other objects to submit to. Each option in the list is a group of objects that all share a characteristic, where the list is identified according to the characteristic. For example, for the characteristic of "places my friends checked-in," the objects included in that list all share the characteristic that they are places that friends of the submitting user have checked-in to. This information may be obtained from the user profiles of the friends of the user.

The submission prompting module 230 receives an input from the user indicating a group. The submission prompting module 230 then lists the objects of the group. For example, if the user chose the "places near Antonio's Nut House" characteristic, the listed objects would all be objects that are affiliated with real world locations in close proximity to Antonio's Nut House.

Additional Considerations

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
maintaining in a social networking system a plurality of user profiles for users of the social networking system;
maintaining in the social networking system a plurality of objects, the objects associated with metadata fields;
logging a plurality of activities by users of the social networking system with respect to the objects;
receiving a submission of content for an object from a user, the submission including an asserted value for a metadata field for the object;
evaluating the submission, using a computing device, to determine whether to add the asserted value to the metadata field for the object, evaluating the submission comprising:
evaluating the veracity of the asserted value for the metadata field based on the user's profile and the user's logged activities;
maintaining, as part of the user profiles, connections between users profiles;
determining a degree of diversity between one of the submitting users and one or more other submitting users, the degree of diversity based on the connections between the submitting user's profile and the other submitting users' profiles; and
evaluating the submission of the user based the degree of diversity; and
responsive to the evaluation, adding the asserted value to the metadata field for the object.

2. The method of claim 1 wherein the submission of content comprises information explicitly provided by the user.

3. The method of claim 2 wherein the explicitly provided information comprises at least one of text, video, audio, pictures, user affinity, and a recommendation.

4. The method of claim 1 wherein the submission of content comprises information implicitly provided by the user.

5. The method of claim 4 wherein the implicitly provided information comprises at least one of a physical real world location of the user, a time of submission, and a retailer's open hours.

6. The method of claim 1 wherein evaluating the submission further comprises:
maintaining, as part of the user interactions with the object, a log of the user's physical real world presence at a real world location associated with the object; and
evaluating the submission based on an extensiveness of the log.

7. The method of claim 1 wherein evaluating the submission further comprises:
determining a reputation for the user based on previous submissions by the user for other objects stored in the social networking system;
evaluating the submission based the reputation of the user.

8. The method of claim 7 wherein the user's reputation is based on a number of submissions by the user that have been evaluated and accepted as additional content for other objects.

9. The method of claim 1 wherein evaluating the submission comprises:
determining a user's expertise in a subject matter of the object based on a content the user's profile;
evaluating the submission based the expertise of the user.

10. A method comprising:
maintaining in a social networking system a plurality of user profiles for users of the social networking system;
maintaining in the social networking system a plurality of objects, the objects associated with metadata fields;
logging a plurality of activities by users of the social networking system with respect to the objects;
receiving a plurality of submissions of content for an object from a plurality of users, each of the submissions including an asserted value for a metadata field for the object;
evaluating the submissions, using a computing device, to determine whether to add one or more of the asserted values to the metadata field for the object, evaluating the submissions comprising:
evaluating the veracity of the asserted values for the metadata field based on the users profiles and the users' logged activities;
maintaining, as part of the user profiles, connections between users profiles;
determining a degree of diversity between the submitting users, the degree of diversity based on the connections between one of the submitting users' profile and the other submitting users' profiles; and
evaluating the submissions based the degree of diversity; and
responsive to the evaluations, adding at least one of the asserted values to the metadata field for the object.

11. A method comprising:
maintaining in a social networking system a plurality of user profiles for users of the social networking system;
maintaining in the social networking system a plurality of objects, the objects associated with metadata fields;
logging a plurality of activities by users of the social networking system with respect to the objects;
receiving a submission of content for an object from a user, the submission including an asserted value for a metadata field for the object;
evaluating the submission, using a computing device, to determine whether to add the asserted value to the metadata field for the object, evaluating the submission comprising:
evaluating the veracity of the asserted value for the metadata field based on the user's profile and the user's logged activities;
maintaining, as part of the user profiles, connections between users profiles;
determining a degree of diversity between one of the submitting users and one or more other submitting users, the degree of diversity based on the connections between the submitting user's profile and the other submitting users' profiles; and
evaluating the submission of the user based the degree of diversity; and
responsive to the evaluation,
adding the asserted value to the metadata field for the object, and
prompting the user to provide additional submissions for other objects by organizing and displaying the other objects into a plurality of groups, the groups determined based on the user's profile and the user's logged activities.

12. The method of claim 11 wherein the groups displayed are determined based on a plurality of connections between the user's profile and other user profiles.

13. The method of claim 11 wherein the groups displayed are determined based on an expected evaluation of a future submission by the user.

14. The method of claim 11 wherein the groups displayed are determined based on a relative need of the objects of the displayed groups for additional information.

15. A computer program product comprising a non-transitory computer readable storage medium having instructions encoded thereon that, when executed by a processor, cause the processor to:
maintain in a social networking system a plurality of user profiles for users of the social networking system;
maintain in the social networking system a plurality of objects, the objects associated with metadata fields;
log a plurality of activities by users of the social networking system with respect to the objects;
receive a submission of content for an object from a user, the submission including an asserted value for a metadata field for the object;
evaluate the submission, using a computing device, to determine whether to add the asserted value to the metadata field for the object, evaluating the submission comprising:
evaluating the veracity of the asserted value for the metadata field based on the user's profile and the user's logged activities;
maintaining, as part of the user profiles, connections between users profiles;
determining a degree of diversity between one of the submitting users and one or more other submitting users, the degree of diversity based on the connections between the submitting user's profile and the other submitting users' profiles; and
evaluating the submission of the user based the degree of diversity; and
responsive to the evaluation, add the asserted value to the metadata field for the object.

16. A computer program product comprising a non-transitory computer readable storage medium having instructions encoded thereon that, when executed by a processor, cause the processor to:
- maintain in a social networking system a plurality of user profiles for users of the social networking system;
- maintain in the social networking system a plurality of objects, the objects associated with metadata fields;
- log a plurality of activities by users of the social networking system with respect to the objects;
- receive a plurality of submissions of content for an object from a plurality of users, each of the submissions including an asserted value for a metadata field for the object;
- evaluate the submissions, using a computing device, to determine whether to add one or more of the asserted values to the metadata field for the object, evaluating the submissions comprising:
  - evaluating the veracity of the asserted values for the metadata field based on the users profiles and the users' logged activities;
  - maintaining, as part of the user profiles, connections between users profiles;
  - determining a degree of diversity between the submitting users, the degree of diversity based on the connections between one of the submitting users' profile and the other submitting users' profiles; and
  - evaluating the submissions based the degree of diversity; and
- responsive to the evaluations, add at least one of the asserted values to the metadata field for the object.

17. A computer program product comprising a non-transitory computer readable storage medium having instructions encoded thereon that, when executed by a processor, cause the processor to:
- maintain in a social networking system a plurality of user profiles for users of the social networking system;
- maintain in the social networking system a plurality of objects, the objects associated with metadata fields;
- log a plurality of activities by users of the social networking system with respect to the objects;
- receive a submission of content for an object from a user, the submission including an asserted value for a metadata field for the object;
- evaluate the submission, using a computing device, to determine whether to add the asserted value to the metadata field for the object, evaluating the submission comprising:
  - evaluating the veracity of the asserted value for the metadata field based on the user's profile and the user's logged activities;
  - maintaining, as part of the user profiles, connections between users profiles;
  - determining a degree of diversity between one of the submitting users and one or more other submitting users, the degree of diversity based on the connections between the submitting user's profile and the other submitting users' profiles; and
  - evaluating the submission of the user based the degree of diversity; and
- responsive to the evaluation,
  - add the asserted value to the metadata field for the object, and
  - prompt the user to provide additional submissions for other objects by organizing and displaying the other objects into a plurality of groups, the groups determined based on the user's profile and the user's logged activities.

* * * * *

UNITED STATES PATENT AND TRADEMARK OFFICE
CERTIFICATE OF CORRECTION

PATENT NO. : 9,021,056 B2  
APPLICATION NO. : 13/324776  
DATED : April 28, 2015  
INVENTOR(S) : Dunn et al.

Page 1 of 1

It is certified that error appears in the above-identified patent and that said Letters Patent is hereby corrected as shown below:

In the Claims

Column 15, line 29, after "based on," delete "a content".
Column 16, line 9, after "users", insert an --'--.
Column 17, line 22, after "users", insert an --'--.

Signed and Sealed this
Tenth Day of May, 2016

Michelle K. Lee
*Director of the United States Patent and Trademark Office*